(12) United States Patent
Tatebe et al.

(10) Patent No.: US 12,344,328 B2
(45) Date of Patent: Jul. 1, 2025

(54) ELECTRIC POWER STEERING SYSTEM

(71) Applicant: SUBARU CORPORATION, Tokyo (JP)

(72) Inventors: Takanori Tatebe, Tokyo (JP); Naoto Yabuki, Tokyo (JP); Kazuki Furukawa, Tokyo (JP); Takahiro Inami, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 272 days.

(21) Appl. No.: 18/100,186

(22) Filed: Jan. 23, 2023

(65) Prior Publication Data
US 2023/0242177 A1 Aug. 3, 2023

(30) Foreign Application Priority Data
Feb. 1, 2022 (JP) .................................. 2022-014206

(51) Int. Cl.
*B62D 5/04* (2006.01)
(52) U.S. Cl.
CPC .................................. *B62D 5/0463* (2013.01)
(58) Field of Classification Search
CPC .... B62D 5/046; B62D 5/0463; B62D 5/0472; B62D 6/008
See application file for complete search history.

(56) References Cited

U.S. PATENT DOCUMENTS

| 4,582,155 A | * | 4/1986 | Ohe ..................... B62D 5/0463 180/444 |
| 4,582,324 A | * | 4/1986 | Koza ...................... G07F 17/32 463/16 |
| 4,878,831 A | * | 11/1989 | Ewing .................... F23N 5/082 431/79 |

(Continued)

FOREIGN PATENT DOCUMENTS

| JP | 2006-69351 A | 3/2006 |
| JP | 2007-137287 A | 6/2007 |

(Continued)

OTHER PUBLICATIONS

241211 Ganet et al.Haptic feedback, Sensors and Actuators Journal (Year: 2015).*

*Primary Examiner* — Carl C Staubach
(74) *Attorney, Agent, or Firm* — TROUTMAN PEPPER LOCKE LLP

(57) ABSTRACT

An electric power steering system includes an electric actuator, a current indication value generation unit, an actuator control unit, and a noise signal generation unit. The electric actuator is configured to apply assist force to a steering device. The steering device is configured to turn a steering wheel of a vehicle. The current indication value generation unit is configured to generate a current indication value in accordance with a target value of the assist force. The actuator control unit is configured to supply electric power to the electric actuator in accordance with the current indication value. The noise signal generation unit is config- (Continued)

ured to add a noise signal to the current indication value. The noise signal has a dominant frequency that is a frequency matching a control clock frequency of the vehicle or a harmonic component of the control clock frequency.

16 Claims, 7 Drawing Sheets

(56) References Cited

U.S. PATENT DOCUMENTS

| | | | | |
|---|---|---|---|---|
| 5,482,129 | A * | 1/1996 | Shimizu | B62D 5/0463 180/446 |
| 6,625,530 | B1 * | 9/2003 | Bolourchi | B62D 6/008 180/402 |
| 11,072,349 | B2 * | 7/2021 | Augst | B60W 50/0097 |
| 12,122,232 | B2 * | 10/2024 | Tatebe | B60K 26/021 |
| 2006/0009894 | A1 * | 1/2006 | Goto | B62D 6/003 701/41 |
| 2006/0047391 | A1 * | 3/2006 | Katou | B62D 6/008 180/443 |
| 2006/0200291 | A1 * | 9/2006 | Wroblewski | B62D 6/002 701/41 |
| 2008/0035411 | A1 * | 2/2008 | Yamashita | B62D 5/049 180/443 |
| 2008/0221769 | A1 * | 9/2008 | Matsuno | B60W 50/16 701/80 |
| 2012/0245797 | A1 * | 9/2012 | Ono | B62D 6/008 701/42 |
| 2013/0226411 | A1 * | 8/2013 | Hirano | B62D 6/00 701/42 |
| 2014/0298949 | A1 * | 10/2014 | Brown | G05G 1/40 74/513 |
| 2017/0349208 | A1 * | 12/2017 | Sugawara | B62D 5/0463 |
| 2023/0242177 | A1 * | 8/2023 | Tatebe | B62D 5/046 701/41 |

FOREIGN PATENT DOCUMENTS

| | | |
|---|---|---|
| JP | 2011-131756 A | 7/2011 |
| JP | 2019-202591 A | 11/2019 |

* cited by examiner

ELECTRIC POWER STEERING SYSTEM

CROSS-REFERENCE TO RELATED APPLICATION

The present application claims priority from Japanese Patent Application No. 2022-014206 filed on Feb. 1, 2022, the entire contents of which are hereby incorporated by reference.

BACKGROUND

The disclosure relates to an electric power steering system.

An electric power steering system (EPS) provided in a vehicle such as an automobile applies assist force to a steering device by an electric actuator such as a motor. The steering device is configured to turn a steering wheel.

As a technique related to the electric power steering system, for example, Japanese Unexamined Patent Application Publication No. 2006-069351 discloses the following. Target reaction torque as a spring component is varied exponentially with respect to a steering angle in accordance with the Weber-Fechner law in such a manner that target reaction torque perceived by a driver via a steering wheel matches human perceptive characteristics. This allows for performing a steering-wheel turning operation with the steering angle and target reaction force torque relationship matching the human perspective characteristics.

Japanese Unexamined Patent Application Publication No. 2007-137287 discloses that spring component torque forming target reaction torque is varied exponentially with respect to a steering angle in a case where a driver rotates a steering wheel while applying steering torque equivalent to the target reaction torque.

Japanese Unexamined Patent Application Publication No. 2011-131756 discloses an electric power steering system that controls a motor on the basis of steering torque. The electric power steering system corrects an assist quantity in accordance with a remaining amount of electric power or a fuel and an amount of electric power supply to an electric load that is higher in priority of electric power supply than the electric power steering system.

Japanese Unexamined Patent Application Publication No. 2019-202591 discloses the following technique in order to recognize traveling information, which has been difficult to recognize, through a mechanical receptor provided on an upper arm of a human body. That is, a steering system applies a tactile noise undetectable by an occupant to a steering wheel, and a frequency of the tactile noise is set to a frequency included in a resonance frequency band of the mechanical receptor provided on the upper arm.

SUMMARY

An aspect of the disclosure provides an electric power steering system that includes an electric actuator, a current indication value generation unit, an actuator control unit, and a noise signal generation unit. The electric actuator is configured to apply assist force to a steering device. The steering device is configured to turn a steering wheel of a vehicle. The current indication value generation unit is configured to generate a current indication value in accordance with a target value of the assist force. The actuator control unit is configured to supply electric power to the electric actuator in accordance with the current indication value. The noise signal generation unit is configured to add a noise signal to the current indication value. The noise signal has a dominant frequency that is a frequency matching a control clock frequency of the vehicle or a harmonic component of the control clock frequency.

An aspect of the disclosure provides an electric power steering system that includes an electric actuator and circuitry. The electric actuator is configured to apply assist force to a steering device. The steering device is configured to turn a steering wheel of a vehicle. The circuitry is configured to supply electric power to the electric actuator in accordance with a current indication value. The circuitry is configured to generate the current indication value in accordance with a target value of the assist force. The circuitry is configured to add a noise signal to the current indication value. The noise signal has a dominant frequency that is a frequency matching a control clock frequency of the vehicle or a harmonic component of the control clock frequency.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
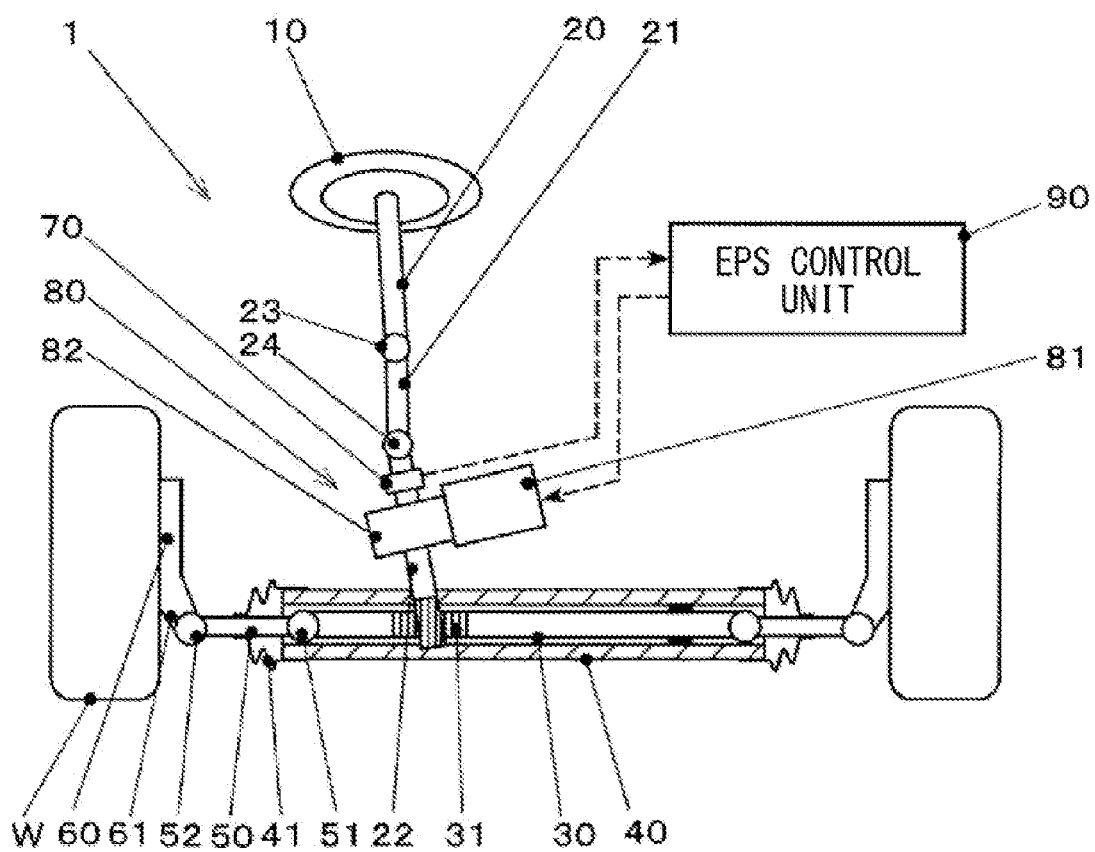
FIG. 1 is a diagram schematically illustrating a configuration of an electric power steering system according to one example embodiment of the disclosure.

In an assist control of an electric power steering system, a region in which assisting is performed with a small current, for example, in a region related to the beginning of steering or a small steering angle contributes to provide a sense of steering.

However, a vehicle involves electric noises related to various electronic controllers. Such electric noises influence the electric power steering system via electric circuits.

Such an influence of the electric noises on the electric circuits in the electric power steering system in a form of power supply variation (i.e., a variation in one or both of a current and a voltage) varies a steering sense felt by a driver in a region where a driving current of an assist motor is small (i.e., a small current region).

The above-described noises from the controllers are generated in accordance with control clock frequencies of electronic devices. It is difficult to remove all of such noises.

For example, the noises may be removed by a filter. However, in this case, if a noise variation remains, a variation rate increases, which increases a variation in steering sense as a result.

It is desirable to provide an electric power steering system that makes it possible to suppress steering sense degradation due to a noise.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

A description is given below of an electric power steering system according to an example embodiment of the disclosure.

The electric power steering system according to the example embodiment may apply steering assist force to a steering device by an electric motor. The steering device may turn, for example, front wheels of a vehicle such as a passenger car.

FIG. 1 is a diagram schematically illustrating a configuration of an electric power steering system 1 according to an example embodiment of the disclosure.

The electric power steering system 1 may include, for example, a steering wheel 10, a steering shaft 20, an intermediate shaft 21, a pinion shaft 22, a rack shaft 30, a rack housing 40, a tie rod 50, a housing 60, a torque sensor 70, an actuator unit 80, and an electric power steering control unit (EPS control unit) 90.

The steering wheel 10 may be, for example, a circular operation member that is to be rotated by a driver to receive an input of a steering operation.

The steering wheel 10 may be disposed in a vehicle compartment of the vehicle and may be opposed to a driver's seat.

An occupant such as the driver obtains a feeling or sense of steering the vehicle from a sense (a tactile sense) transmitted from the steering wheel 10 to his or her fingers.

The steering shaft 20 may be a rotational shaft with one end attached to the steering wheel 10. The steering shaft 20 may be the rotation shaft that transmits a rotational motion of the steering wheel 10 to a rack-and-pinion mechanism. The rack-and-pinion mechanism may convert the rotational motion of the steering wheel 10 into a translation motion in a vehicle-width direction.

To an end of the steering shaft 20 opposite to the steering wheel 10 side, the intermediate shaft 21 and the pinion shaft 22 may be coupled in order.

A universal joint (Cardan joint) 23 may be provided between the steering shaft 20 and the intermediate shaft 21. A universal joint (Cardan joint) 24 may be provided between the intermediate shaft 21 and the pinion shaft 22. The universal joints 23 and 24 may allow for rotation transmission in a state where the steering shaft 20, the intermediate shaft 21, and the pinion shaft 22 are not straightly aligned.

A tip of the pinion shaft 22 may be provided with a pinion gear that meshes with a rack gear 31 of the rack shaft 30 and thereby drives the rack shaft 30.

The rack shaft 30 may be a columnar member that is disposed with its longitudinal direction (axial direction) extending along the vehicle-width direction.

The rack shaft 30 may be so supported as to be translatable in the vehicle-width direction with respect to a vehicle body.

The rack shaft 30 may be partially provided with the rack gear 31 that meshes with the pinion gear of the pinion shaft 22.

The rack gear 31 may be driven by the pinion gear in accordance with the rotation of the steering shaft 20. This may cause the rack shaft 30 to be translated (to move straight) along the vehicle-width direction.

The rack gear 31 may be offset to the left or right side in the vehicle-width direction. For example, the rack gear 31 may be offset to the driver's seat side.

For example, in a case where the vehicle is a so-called right-hand drive vehicle with the driver's seat on the front-right, the rack gear 31 may be offset to the right side from the middle in a neutral state.

The rack housing 40 may be a substantially cylindrical member that contains the rack shaft 30 while supporting the rack shaft 30 in a relatively displaceable manner along the vehicle-width direction.

The rack housing 40 may be provided with rack boots 41 at respective opposed ends.

The rack boots 41 may be members that prevent a foreign matter such as dust from entering the rack housing 40 while allowing the tie rod 50 to be relatively displaced with respect to the rack housing 40.

The rack boots 41 may include, for example, a resin-based material such as an elastomer. The rack boots 41 may each have a pleated cylindrical shape and may be flexible.

The tie rod 50 may be a shaft-shaped interlocking member that couples an end of the rack shaft 30 and a knuckle arm 61 of the housing 60 to each other. The tie rod 50 may cause the housing 60 to rotate around a kingpin axis in association with the translation motion of the rack shaft 30.

An end of the tie rod 50 on an inner side in the vehicle-width direction may be swingably coupled to the end of the rack shaft 30 via a ball joint 51.

An end of the tie rod 50 on an outer side in the vehicle-width direction may be coupled to the knuckle arm 61 of the housing 60 via a ball joint 52.

A portion at which the tie rod 50 and the ball joint 52 are coupled to each other may be provided with a turnbuckle mechanism for toe-in adjustment.

The housing (knuckle) 60 may be a member that contains a hub bearing. The hub bearing may so support a wheel W in such a manner that the wheel W is rotatable around an axle.

The housing 60 may include the knuckle arm 61 that protrudes toward a front side or a rear side with respect to the axle.

The housing 60 may be so supported as to be rotatable around the kingpin axis that is a predetermined rotation center axis.

For example, in a case where a front suspension of the vehicle is a MacPherson strut suspension, the kingpin axis may be a virtual axis connecting: the bearing center of a strut top mount; and the center of a ball joint that couples a lower portion of the housing 60 and a transverse link (a lower arm) to each other.

The housing 60 may be pushed and pulled in the vehicle-width direction by the rack shaft 30 via the tie rod 50. The housing 60 may be thereby rotated around the kingpin axis and turn the wheel W.

The torque sensor 70 may detect torque acting on the pinion shaft 22.

The torque sensor 70 may be provided at a portion of the pinion shaft 22 that is closer to the intermediate shaft 21 than the actuator unit 80.

An output of the torque sensor 70 may be transmitted to the electric power steering control unit 90.

The actuator unit 80 may be a driving device that rotationally drives the pinion shaft 22 and thereby performs power assist upon manual driving or performs a steering operation upon automatic driving.

The actuator unit 80 may include, for example, a motor 81 and a gear box 82.

The motor 81 may be an electric actuator that generates driving force to be applied to the steering shaft 20.

A rotation direction and output torque of the motor 81 may be controlled by the electric power steering control unit 90.

The gear box 82 may include a reduction gear train that reduces the rotational output of the motor 81 (i.e., amplifies torque) and transmits the reduced rotational output to the pinion shaft 22.

The electric power steering (EPS) control unit 90 may be a control device (a motor controller) that provides a current indication value to the motor 81. The current indication value may be for controlling the rotation direction and the output torque of the motor 81. In one embodiment, the electric power steering control unit 90 may serve as an "actuator control unit".

The electric power steering control unit 90 may include, for example, a microcomputer that includes: an information processor such as a central processing unit (CPU); a storage such as a random-access memory (RAM) or a read-only memory (ROM); an input/output interface; and a bus coupling them to each other.

The electric power steering control unit 90 may be configured to acquire information including, without limitation, information regarding the output of the torque sensor 70, information regarding a traveling speed of the vehicle (i.e., a vehicle speed), and information regarding an operating state of another in-vehicle electronic device. The electric power steering control unit 90 may be configured to acquire such information, for example, directly or via an in-vehicle local area network (LAN) such as a controller area network (CAN) communication system.

Upon manual driving of the vehicle, the electric power steering control unit 90 may set the current indication value to be supplied to the motor 81 on the basis of a torque input direction and a detected torque value obtained by the torque sensor 70.

Figure 2:
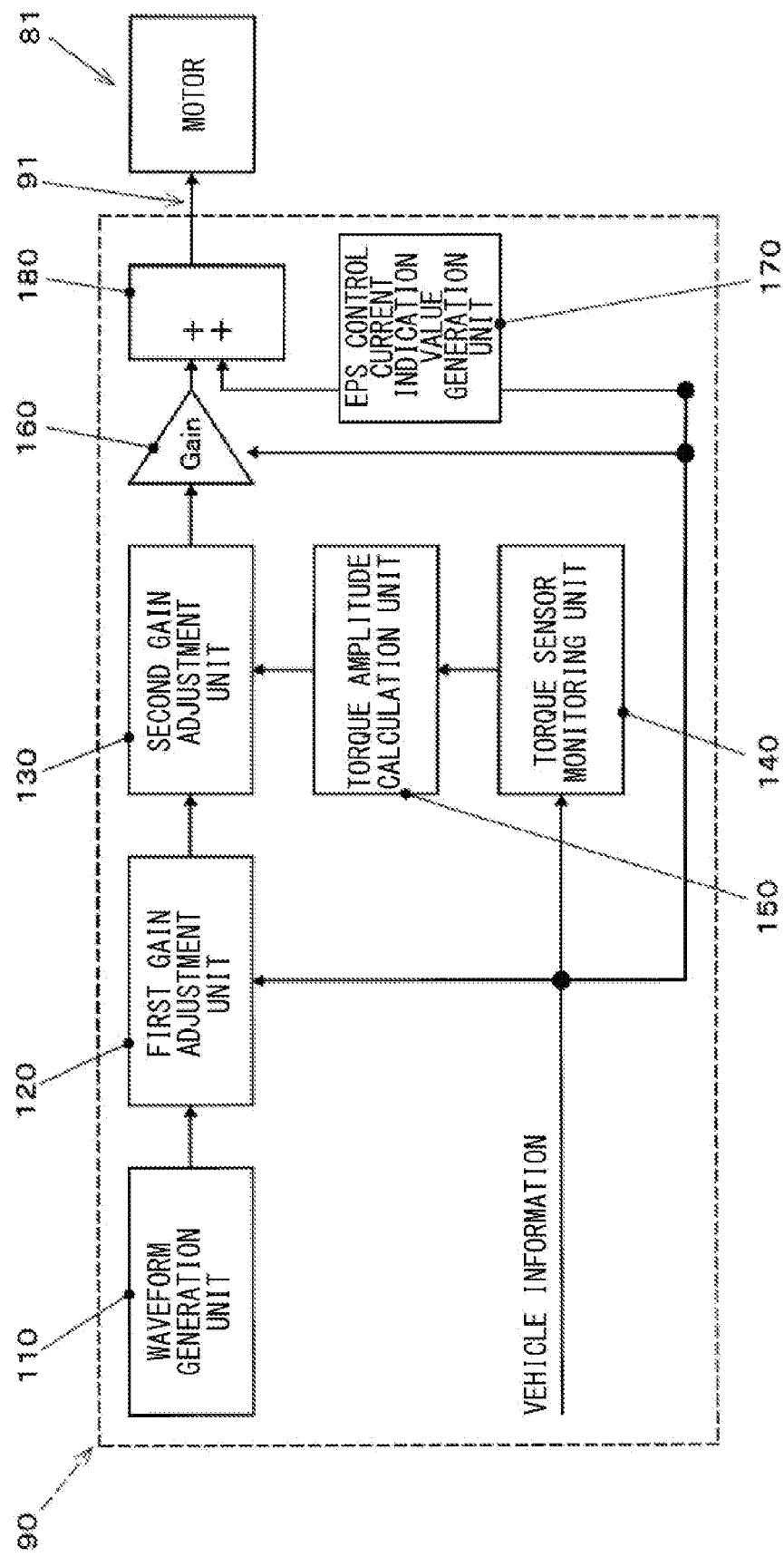
FIG. 2 is a block diagram illustrating a configuration of an electric power steering control unit according to one example embodiment.

The electric power steering control unit 90 may include a power supply device that supplies, via a signal line 91 illustrated in FIG. 2, the motor 81 with electric power having a current value and a voltage value corresponding to the current indication value.

FIG. 2 is a block diagram illustrating a configuration of the electric power steering control unit 90 according to the example embodiment.

The electric power steering control unit 90 may include, for example, a waveform generation unit 110, a first gain adjustment unit 120, a second gain adjustment unit 130, a torque sensor monitoring unit 140, a torque amplitude calculation unit 150, a gain selection unit 160, an EPS control current indication value generation unit 170, and an addition unit 180.

The waveform generation unit 110 may generate a waveform of a noise signal to be added to the current indication value supplied to the motor 81. In one embodiment, the waveform generation unit 110 may serve as a "noise signal generation unit".

Figure 3:
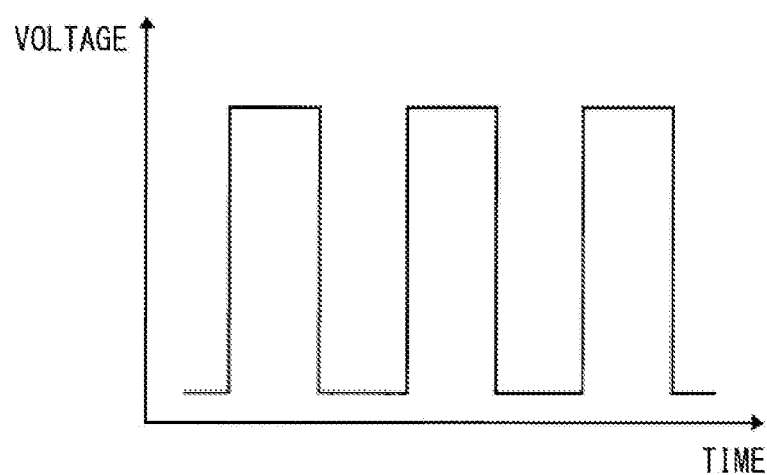
FIG. 3 is a diagram schematically illustrating an example of a waveform of a noise signal according to one example embodiment.

FIG. 3 is a diagram schematically illustrating an example of the waveform of the noise signal according to the example embodiment.

In FIG. 3, the horizontal axis represents time, and the vertical axis represents a voltage.

As illustrated in FIG. 3, the waveform of the noise signal may be, for example, a rectangular wave. However, the noise signal is not particularly limited in waveform and may have any other waveform.

According to the example embodiment, for example, the frequency of the noise signal may be set to have a dominant frequency that matches the control clock frequency of the vehicle or a harmonic component of the control clock frequency within a range from 100 Hz to 300 Hz both inclusive.

For example, in a case where the control clock frequency is 250 Hz, the frequency of the noise signal may also be set to 250 Hz.

Reasons for this will be described below.

Note that, as used herein, the "dominant frequency" refers to a frequency having an amplitude relatively great as compared with other frequencies. Generally, the dominant frequency may often be the same as a frequency that has a relatively great amplitude among natural values (natural frequencies).

Examples of sensory receptors (tactile sensors) by which the driver's finger touching the steering wheel 10 acquires a tactile sensation (skin sensation) may include Merkel cells, Meissner corpuscles, and Pacinian corpuscles.

Figure 4:
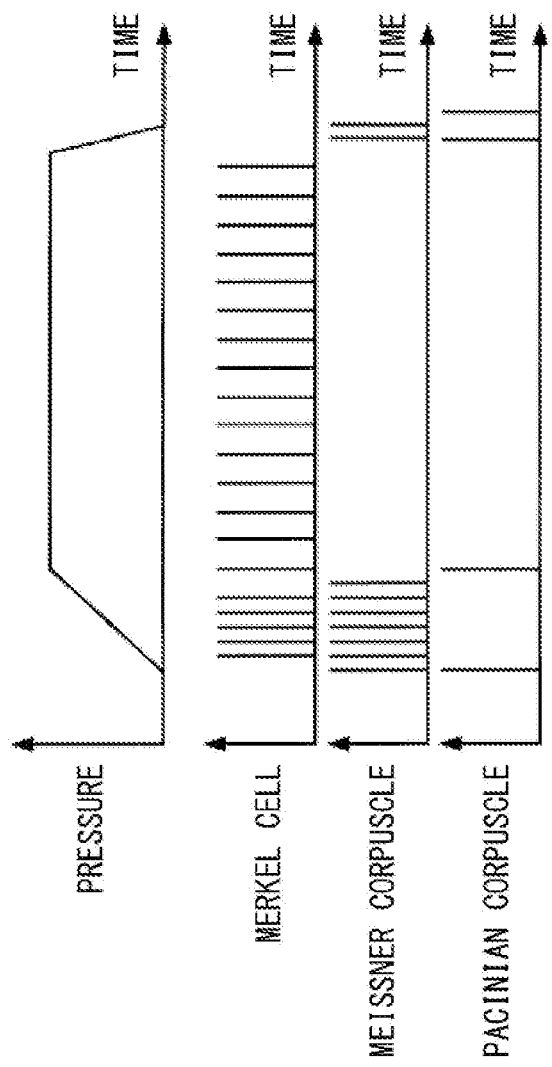
FIG. 4 is a diagram schematically illustrating timings of electric pulses outputted by respective receptors in a case where a finger touches an object.

FIG. 4 is a diagram schematically illustrating timings of electric pulses outputted by respective receptors in a case where a finger touches an object.

In FIG. 4, the horizontal axes represent time, and the vertical axes represent, in order from the top, pressure, an electric pulse generation state of the Merkel cells, an electric pulse generation state of the Meissner corpuscles, and an electric pulse generation state of the Pacinian corpuscles.

The Merkel cells respond relatively slowly and may react to a DC component.

The Meissner corpuscles may react to a situation where a variation in contact pressure (i.e., a speed) is present.

Because the Meissner corpuscles usually react when the speed is present, if a noise signal having a frequency to which the Meissner corpuscles are highly sensitive is used, the noise signal may be easily sensed as vibration by the driver.

The Pacinian corpuscles may correspond to a transient variation moment. The Pacinian corpuscles may be the most sensitive among the above-mentioned receptors.

It is assumable that the Pacinian corpuscles are dominant among receptors by which the driver senses reaction force of a small operation.

Figure 5:
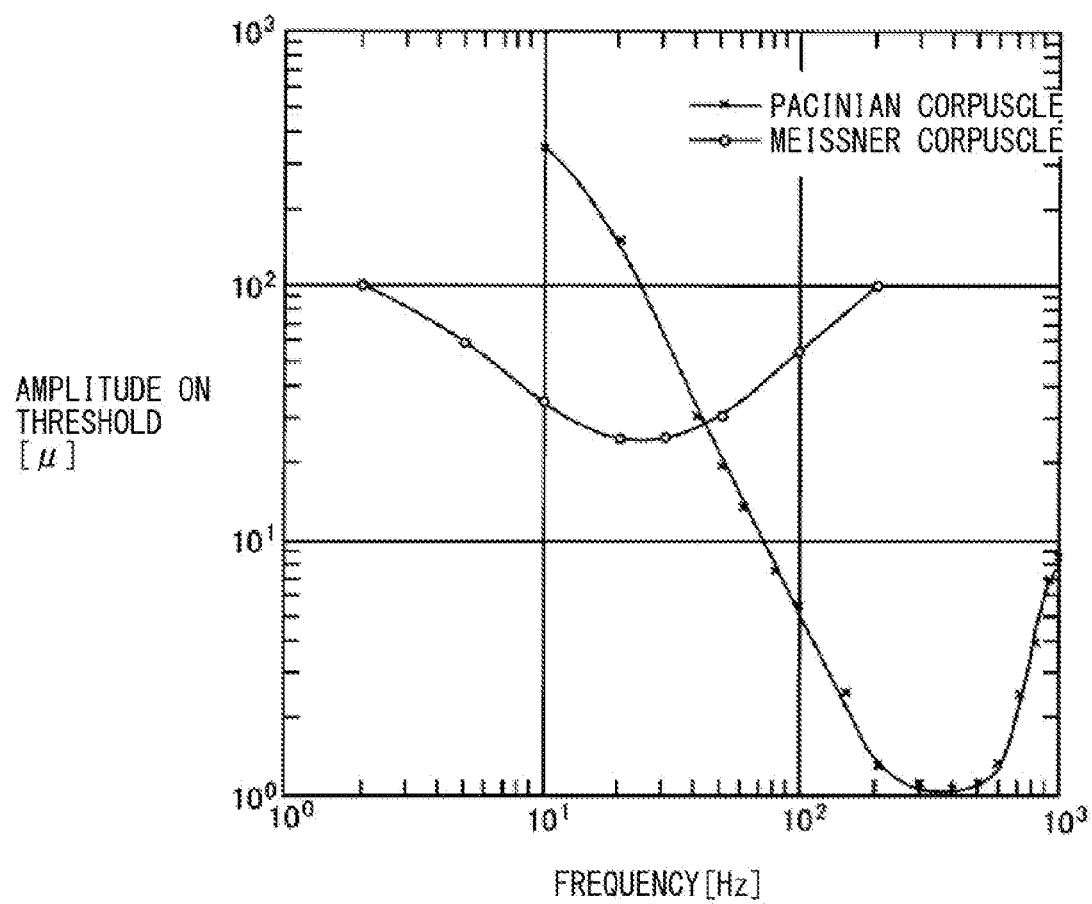
FIG. 5 is a diagram illustrating respective sensitivity distributions of Pacinian corpuscles and Meissner corpuscles with respect to a frequency.

FIG. 5 is a diagram illustrating respective sensitivity distributions of the Pacinian corpuscles and the Meissner corpuscles with respect to a frequency.

In FIG. 5, the horizontal axis represents the frequency. The vertical axis represents an amplitude on a threshold, and the smaller value represents higher sensitivity.

As illustrated in FIG. 5, the Pacinian corpuscles have favorable sensitivity around a region from 100 Hz to 300 Hz both inclusive.

According to the example embodiment, the control clock frequency of the vehicle may be 250 Hz, which is included in the above-described region. Accordingly, a rectangular wave having the dominant frequency of 250 Hz may be used as the noise signal.

The first gain adjustment unit 120 may perform first gain adjustment on a gain of the noise signal to be added to the current indication value. The first gain adjustment will be described below.

The first gain adjustment may vary the gain of the noise signal in accordance with a variation in the vehicle speed.

The first gain adjustment may be performed in order to achieve an appropriate amplitude level of the noise signal in accordance with a variation in the current indication value of the assist control. The current indication value of the assist control may be the base for adding the noise signal for each vehicle speed.

Figure 6:
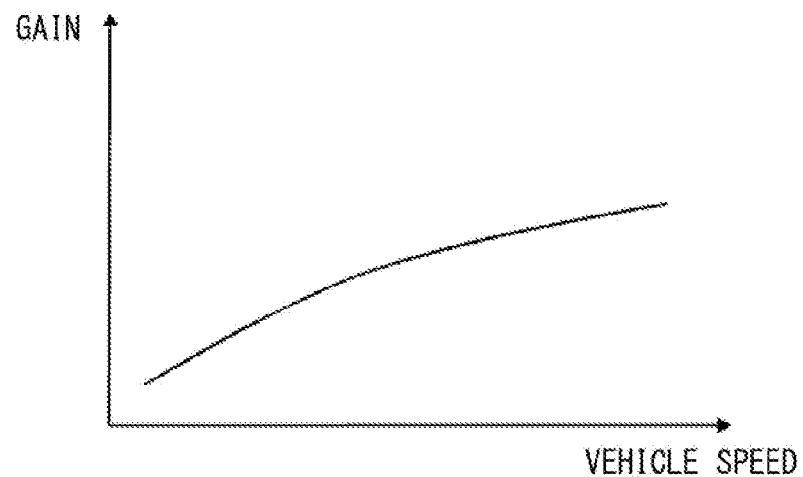
FIG. 6 is a diagram schematically illustrating an example of gain adjustment to be performed by a first gain adjustment unit.

FIG. 6 is a diagram schematically illustrating an example of gain adjustment to be performed by the first gain adjustment unit 120.

In FIG. 6, the horizontal axis represents the vehicle speed, and the horizontal axis represents the gain by which the noise signal is to be multiplied.

For example, the gain may be increased in accordance with an increase in the vehicle speed.

The second gain adjustment unit 130 may perform second gain adjustment on the noise signal that has already undergone the first gain adjustment. The second gain adjustment will be described below.

The second gain adjustment may vary the gain of the noise signal in accordance with a variation in the torque amplitude in a noise generation frequency band in order to reduce a disturbance influence upon traveling. The noise generation frequency band may be, for example, around 250 Hz.

The second gain adjustment unit 130 may perform the second gain adjustment on the basis of respective outputs of the torque sensor monitoring unit 140 and the torque amplitude calculation unit 150.

The torque sensor monitoring unit 140 may monitor the output of the torque sensor 70 and hold an output history for a predetermined period.

Figure 7:
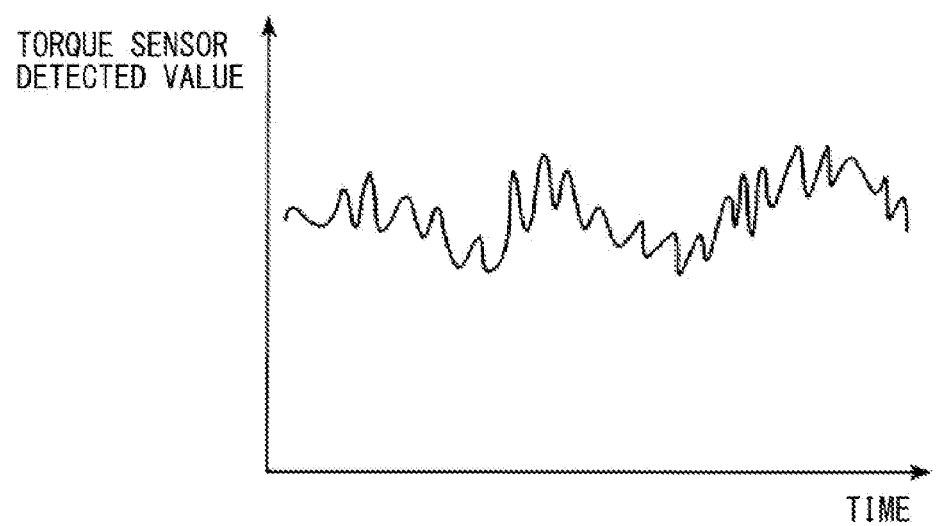
FIG. 7 is a diagram schematically illustrating an example of an output history of a torque sensor.

FIG. 7 is a diagram schematically illustrating an example of an output history of the torque sensor 70.

In FIG. 7, the horizontal axis represents time, and the vertical axis represents a detected value obtained by the torque sensor 70.

Data regarding the output history of the torque sensor 70 may be supplied to the torque amplitude calculation unit 150.

The torque amplitude calculation unit 150 may perform bandpass filtering on the output of the torque sensor 70 supplied from the torque sensor monitoring unit 140 and thereby extract a component of a particular frequency region. The torque amplitude calculation unit 150 may calculate a torque amplitude in the particular frequency region.

Figure 8:
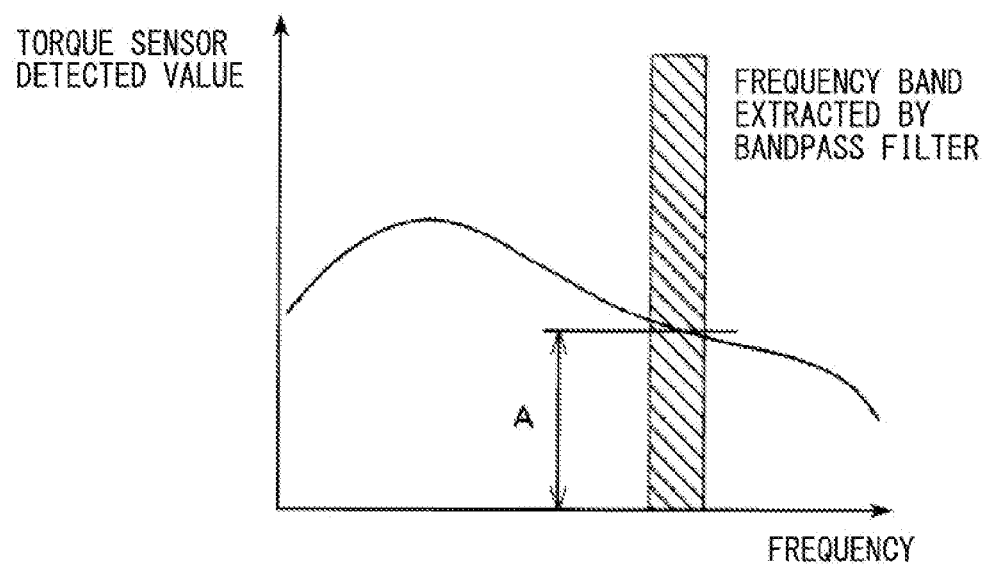
FIG. 8 is a diagram schematically illustrating a method of calculating a torque amplitude by a torque amplitude calculation unit.

FIG. 8 is a diagram schematically illustrating a method of calculating the torque amplitude by the torque amplitude calculation unit 150.

In FIG. 8, the horizontal axis represents a frequency, and the vertical axis represents the detected value obtained by the torque sensor 70.

A bandpass filter may be configured to extract, for example, a frequency band around 250 Hz which is the control clock frequency of the vehicle.

The torque amplitude in the extracted frequency band may be supplied to the second gain adjustment unit 130. Such a torque amplitude may be, for example, an average value of the frequency band.

Figure 9:
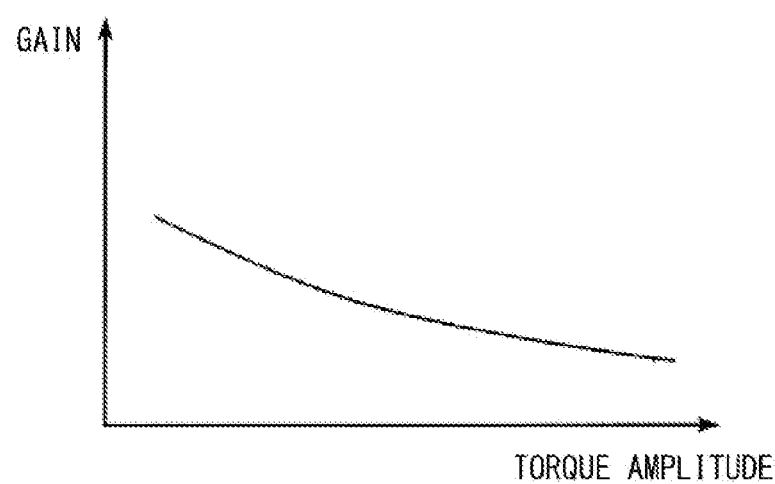
FIG. 9 is a diagram schematically illustrating an example of gain adjustment to be performed by a second gain adjustment unit.

FIG. 9 is a diagram schematically illustrating an example of gain adjustment to be performed by the second gain adjustment unit 130.

In FIG. 9, the horizontal axis represents the torque amplitude calculated by the torque amplitude calculation unit 150, and the vertical axis represents the gain by which the noise signal is multiplied.

As illustrated in FIG. 9, the second gain adjustment unit 130 may reduce the gain in accordance with an increase in the torque amplitude.

The gain selection unit 160 may generate gain values that are different in magnitude level on the basis of the value obtained by multiplication with use of the respective gains set by the first gain adjustment unit 120 and the second gain adjustment unit 130. In addition, the gain selection unit 160 may select one gain value among the gain values in accordance with the information regarding the operating state of the other electronic device acquired by the electric power steering control unit 90.

The electric power steering control unit 90 may acquire information regarding ON/OFF of electronic devices that generate a noise having a dominant frequency matching the control clock frequency of the vehicle or a harmonic component thereof. Examples of the electronic devices may include a control unit. The control clock frequency of the vehicle may be, for example, 250 Hz.

Such electronic devices may include, for example: an electronic device that is to be switched between an operating state and a stopped state in accordance with an ON/OFF operation performed by an occupant such as a driver; and an electronic device that operates only in a case where the vehicle is in a particular condition. Therefore, the number of operating electronic devices may vary. In this case, the amplitude of the noise component derived from the control clock frequency superimposed on the current indication value of the assist control may also vary.

The gain selection unit 160 may select a greater gain value among the gain values in accordance with an increase in the number of the operating electronic devices among the electronic devices that generate the noise described above.

The gain selection unit 160 may output, as the noise signal to be added to the current indication value, a value obtained by multiplying the noise signal generated by the waveform generation unit 110 by the selected gain.

The EPS control current indication value generation unit 170 may generate the current indication value for controlling the rotation direction and the driving torque of the motor 81 in the assist control on the basis of, for example, the output of the torque sensor 70 and the vehicle speed of the vehicle.

In one embodiment, the EPS control current indication value generation unit 170 may serve as a "current indication value generation unit".

The current indication value generated by the EPS control current indication value generation unit 170 may be transmitted to the addition unit 180.

The addition unit 180 may transmit, to the power supply device of the motor 81, a value obtained by adding the noise signal transmitted from the gain selection unit 160 to the current indication value transmitted from the EPS control current indication value generation unit 170, as the current indication value to be used in controlling the motor 81.

The power supply device may sequentially supply, to the motor 81, driving power having the current value and the voltage value corresponding to the current indication value. The power supply device may thus perform power assist for the electric power steering system 1.

Here, a variation in the driving power supply of the motor 81 in a standard state is regarded as A. For example, the variation in the current value, i.e., the standard stimulus, is regarded as A.

In a case where a variation is further added to the driving power supply (for example, the current value) of the motor 81 and a minimum variation amount that allows for sensing a variation in steering force (a just noticeable difference) is AA, AA/A is a predetermined value, that is, the Weber fraction W in the Weber-Fechner law.

The just noticeable difference AA may be determined, for example by an experiment. For example, any amount of noise is added to the base noise (the variation amount A), and the just noticeable difference AA may be determined from the minimum value that allows the driver to perceive the variation.

According to the example embodiment, as described in Expression 1, the gain value of the noise signal (in other words, an amplitude of the noise signal) may be selected in accordance with an increase or a decrease in the variation value of the base signal so that a ratio of the just noticeable difference AA to a sum value of the current indication value generated by the EPS control current indication value generation unit 170 and the noise signal value to be added is substantially constantly less than the Weber fraction W. The above-described sum value may be the output value of the addition unit 180.

$$W > \Delta A/(\text{Motor driving current value based on sum value of current indication value generated by EPS control current indication value generation unit 170 and noise signal value}) \quad \text{(Expression 1)}$$

According to the example embodiment described above, the following effects are obtainable.

(1) A noise signal having a dominant frequency set to a frequency of a noise derived from the control clock frequency (i.e., a control clock noise) may be generated, and the generated noise signal may be added to the current indication value of the motor 81 of the electric power steering system 1. This allows the variation in the driving power source of the motor 81 due to the control clock noise to be small with respect to the variation in noise in the current indication value as a whole. Accordingly, it is possible to stabilize the steering sense felt by the driver.

(2) The dominant frequency of the noise signal may be set within a range from 100 Hz to 300 Hz both inclusive, and the noise signal having the dominant frequency within the frequency band which the Pacinian corpuscles are highly sensitive to may be added to the current indication value of the motor 81 of the electric power steering system 1. The Pacinian corpuscles are highly sensitive among human tactile sense receptors. This makes it possible to more effectively achieve the above-described effects.

(3) A ratio of the just noticeable difference AA to the amplitude of the noise in the current indication value with the noise signal added may be less than or equal to the Weber fraction W. The just noticeable difference AA may be a variation amount that allows the occupant to sense the variation in steering force. This makes it possible to reliably achieve the above-described effects.

(4) The first gain adjustment and the second gain adjustment may be performed. The first gain adjustment may increase the gain of the noise signal in accordance with an increase in the vehicle speed. The second gain adjustment may reduce the gain of the noise signal in accordance with an increase in the torque amplitude. Even in a case where the current indication value for the motor 81 varies in magnitude in accordance with the traveling speed of the vehicle or in a case where the torque amplitude of the electric power steering system 1 varies in accordance with the traveling state, this makes it possible to add the noise signal having an amplitude suitable for such a variation. Accordingly, it is possible to secure the above-described effects.

(5) The gain value of the noise signal (i.e., the amplitude of the noise signal) may be selected in accordance with the number of the operating electronic devices among the electronic devices that are provided in the vehicle and generate a noise derived from the control clock frequency. This makes it possible to secure the above-described effects even in a case where many electronic devices are in operation and the noise derived from the control clock frequency is therefore great.

As described above, according to the electric power steering system of the example embodiment, it is possible to suppress steering sense degradation due to a noise.

Although some embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

(1) Components included in the electric power steering system and the electric power steering control unit are not limited to the above-described example embodiments in various configurations including shapes, structures, materials, operations, arrangements, and quantities, and may be appropriately modified in terms thereof.

(2) Although a rectangular wave signal is used as an example of the noise signal in the example embodiment, the noise signal is not limited thereto and may have any other waveform such as a sine wave, a triangular wave, or a random wave. In addition, a method of adjusting a gain is not limited to that described in the example embodiment and modifications may be made appropriately.

Each of the electric power steering control unit 90, the waveform generation unit 110, the first gain adjustment unit 120, the second gain adjustment unit 130, the torque sensor monitoring unit 140, the torque amplitude calculation unit 150, the gain selection unit 160, the EPS control current indication value generation unit 170, and the addition unit 180 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the electric power steering control unit 90, the waveform generation unit 110, the first gain adjustment unit 120, the second gain adjustment unit 130, the torque sensor monitoring unit 140, the torque amplitude calculation unit 150, the gain selection unit 160, the EPS control current indication value generation unit 170, and the addition unit 180 illustrated in FIG. 2. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the electric power steering control unit 90, the waveform generation unit 110, the first gain adjustment unit 120, the second gain adjustment unit 130, the torque sensor monitoring unit 140, the torque amplitude calculation unit 150, the gain selection unit 160, the EPS control current indication value generation unit 170, and the addition unit 180 illustrated in FIG. 2.

The invention claimed is:

1. An electric power steering system comprising:
an electric actuator configured to apply assist force to a steering device, the steering device being configured to turn a steering wheel of a vehicle;
at least one processor; and
at least one machine readable non-transitory tangible medium storing instructions that are configured to cause the at least one processor to:
generate a current indication value in accordance with a target value of the assist force;
supply electric power to the electric actuator in accordance with the current indication value; and
add a noise signal to the current indication value, the noise signal having a dominant frequency that is a frequency matching a control clock frequency of the vehicle or a harmonic component of the control clock frequency, wherein
an amplitude of the noise signal is increased in accordance with an increase in a traveling speed of the vehicle, and
the amplitude of the noise signal is decreased in accordance with an increase in torque amplitude of the steering device.

2. The electric power steering system according to claim 1, wherein the dominant frequency is a frequency within a range that is greater than or equal to 100 hertz and less than or equal to 300 hertz.

3. The electric power steering system according to claim 1, wherein the amplitude of the noise signal is set to allow a ratio of a minimum amplitude to an amplitude of a noise to be less than or equal to a predetermined value, the minimum amplitude being a minimum amplitude that allows an occupant of the vehicle to sense a variation in steering force, the noise being to be generated in the current indication value with the noise signal added.

4. The electric power steering system according to claim 2, wherein the amplitude of the noise signal is set to allow a ratio of a minimum amplitude to an amplitude of a noise to be less than or equal to a predetermined value, the minimum amplitude being a minimum amplitude that allows an occupant of the vehicle to sense a variation in steering force, the noise being to be generated in the current indication value with the noise signal added.

5. The electric power steering system according to claim 1, wherein the instructions are configured to cause the processor to change an amplitude of the noise signal in accordance with an operating state of an electronic device provided in the vehicle.

6. The electric power steering system according to claim 2, wherein the instructions are configured to cause the processor to change an amplitude of the noise signal in accordance with an operating state of an electronic device provided in the vehicle.

7. The electric power steering system according to claim 3, wherein the instructions are configured to cause the processor to change the amplitude of the noise signal in accordance with an operating state of an electronic device provided in the vehicle.

8. The electric power steering system according to claim 4, wherein the instructions are configured to cause the processor to change the amplitude of the noise signal in accordance with an operating state of an electronic device provided in the vehicle.

9. An electric power steering system comprising:
an electric actuator configured to apply assist force to a steering device, the steering device being configured to turn a steering wheel of a vehicle; and
circuitry configured to
supply electric power to the electric actuator in accordance with a current indication value,
generate the current indication value in accordance with a target value of the assist force, and
add a noise signal to the current indication value, the noise signal having a dominant frequency that is a frequency matching a control clock frequency of the vehicle or a harmonic component of the control clock frequency, wherein
an amplitude of the noise signal is increased in accordance with an increase in a traveling speed of the vehicle, and
the amplitude of the noise signal is decreased in accordance with an increase in torque amplitude of the steering device.

10. The electric power steering system according to claim 9, wherein the dominant frequency is a frequency within a range that is greater than or equal to 100 hertz and less than or equal to 300 hertz.

11. The electric power steering system according to claim 9, wherein the amplitude of the noise signal is set to allow a ratio of a minimum amplitude to an amplitude of a noise to be less than or equal to a predetermined value, the minimum amplitude being a minimum amplitude that allows an occupant of the vehicle to sense a variation in steering force, the noise being to be generated in the current indication value with the noise signal added.

12. The electric power steering system according to claim 10, wherein the amplitude of the noise signal is set to allow a ratio of a minimum amplitude to an amplitude of a noise to be less than or equal to a predetermined value, the minimum amplitude being a minimum amplitude that allows an occupant of the vehicle to sense a variation in steering force, the noise being to be generated in the current indication value with the noise signal added.

13. The electric power steering system according to claim 1, wherein the circuitry is configured to change an amplitude of the noise signal in accordance with an operating state of an electronic device provided in the vehicle.

14. The electric power steering system according to claim 10, wherein the circuitry is configured to change an amplitude of the noise signal in accordance with an operating state of an electronic device provided in the vehicle.

15. The electric power steering system according to claim 11, wherein the circuitry is configured to change the amplitude of the noise signal in accordance with an operating state of an electronic device provided in the vehicle.

16. The electric power steering system according to claim 12, wherein the circuitry is configured to change the amplitude of the noise signal in accordance with an operating state of an electronic device provided in the vehicle.

* * * * *